US009360706B2

(12) United States Patent
Huang et al.

(10) Patent No.: US 9,360,706 B2
(45) Date of Patent: Jun. 7, 2016

(54) BACKLIGHT MODULE AND CORRESPONDING LIQUID CRYSTAL DISPLAY DEVICE

(75) Inventors: Jianfa Huang, Shenzhen (CN); Qian Cao, Shenzhen (CN); Chechang Hu, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 14 days.

(21) Appl. No.: 13/522,963

(22) PCT Filed: Apr. 13, 2012

(86) PCT No.: PCT/CN2012/073989
§ 371 (c)(1),
(2), (4) Date: Jul. 19, 2012

(87) PCT Pub. No.: WO2013/152500
PCT Pub. Date: Oct. 17, 2013

(65) Prior Publication Data
US 2015/0022756 A1    Jan. 22, 2015

(30) Foreign Application Priority Data

Apr. 12, 2012 (CN) .......................... 2012 1 0106335

(51) Int. Cl.
*G02F 1/1335* (2006.01)
*F21Y 111/00* (2016.01)

(52) U.S. Cl.
CPC .... *G02F 1/133608* (2013.01); *G02F 1/133603* (2013.01); *G02F 1/133606* (2013.01); *F21Y 2111/001* (2013.01); *F21Y 2111/002* (2013.01); *G02F 2001/133607* (2013.01); *G02F 2001/133628* (2013.01)

(58) Field of Classification Search
CPC ............. G02F 1/133603; G02F 2001/133607; G02F 1/133605; G02F 1/133611; G02F 1/133526; G02F 2001/133628; G02F 1/133602; G02F 1/133385; G02F 1/133608; G02F 1/133606; G02F 1/133609; G02F 2001/166607; F21Y 2105/001; F21Y 2111/001; F21Y 2111/002; F21V 29/004; F21V 29/22; F21V 29/20; F21V 29/00; F21V 29/26; F21V 29/246; F21V 5/04; F21V 5/046
USPC ............. 349/61, 62, 67; 362/97.1, 97.2, 97.3, 362/364
See application file for complete search history.

(56) References Cited

U.S. PATENT DOCUMENTS

| | | | | |
|---|---|---|---|---|
| 2006/0215075 A1* | 9/2006 | Huang | .............. | G02F 1/133603 349/67 |
| 2008/0303757 A1* | 12/2008 | Ohkawa | .................... | F21V 5/04 345/82 |
| 2011/0305003 A1* | 12/2011 | Lee | ...................... | G02B 6/0021 362/97.1 |

* cited by examiner

*Primary Examiner* — Paisley L Arendt
*Assistant Examiner* — Angela Davison
(74) *Attorney, Agent, or Firm* — Mark M. Friedman

(57) ABSTRACT

The present invention relates to a backlight module and a corresponding liquid crystal display panel. The backlight module includes a backboard having multiple concave portions formed on an inner surface of the backboard and multiple light sources mounted in the concave portions. The backlight module and the corresponding liquid crystal display device of the present invention can reduce the thickness of direct-type backlight module without affecting the optical quality of the lights emitted from the backlight module and increasing the manufacturing cost of the backlight module.

3 Claims, 5 Drawing Sheets

BACKLIGHT MODULE AND CORRESPONDING LIQUID CRYSTAL DISPLAY DEVICE

BACKGROUND OF THE INVENTION

1. Field of the Invention

The present invention relates to a field of liquid crystal display technology, especially to a backlight module and a corresponding liquid crystal display device that the thickness of the direct-type backlight module is reduced.

2. Description of the Related Art

Liquid crystal display devices have been widely used in many kinds of electronic products. Liquid crystal display devices are mostly backlight-type liquid crystal devices that have a liquid crystal panel and a backlight module. Backlight modules are sorted into side-light type and direct-light type based on the incident position of their light sources.

FIG. 1 is a schematic view of a conventional direct-light type backlight module. The direct-light type backlight module includes a backboard 11, multiple light sources 12, a diffuser panel 13 and an optical film 14. The light sources 12 are mounted on the backboard 11. The diffuser panel 13 has a light-receiving surface for receiving lights emitting from the light sources 12. The optical film 14 is used to improve the optical effect of the lights from the diffuser panel 13. The light sources 12 each includes a base 121 (such as a printed circuit board), an LED 122 mounted on the base 121 and a heat sink 123 connected to the base 121 for dissipating heat. The light sources 12 each is connected to the backboard 11 via its heat sink 123. Meanwhile, the backboard 11 has concave portions 111 mounted on an inner surface thereof. The concave portions 111 are relatively protruded out from a back of the backboard 11 so as to be attached to a case of a corresponding liquid crystal display device.

With reference to FIG. 1, the space between the backboard 11 and the diffuser board 13 is called "backlight cavity", in order to reduce the thickness of the backlight module to satisfy the development of thin liquid crystal display television, people commit themselves to reducing the height of the backlight cavity to reduce the thickness of the backlight module. There are a few known solutions for reducing the height of the backlight cavity:

1. Directly reduce the light-mixing distance D from the light-emitting surface of the light sources 12 to the diffuser panel 13; however this solution will decrease the uniformity of the lights emitted from the backlight module; and 2. Increase the number of the light sources in the backlight module; this solution can relatively reduce the light-mixing distance D from the light-emitting surface of the light sources 12 to the diffuser panel 13 without affecting the uniformity of the lights emitted from the backlight module, but causes an increase in the manufacturing cost of the backlight module.

Hence, it is necessary to provide a backlight module and a corresponding liquid crystal display device to overcome the problems existing in the conventional technology.

SUMMARY OF THE INVENTION

The present invention provides a backlight module and a corresponding liquid crystal display device that the thickness of the backlight module is reduced and does not affect optical quality of the lights emitted from the backlight module or increase the manufacturing cost of the backlight module. Therefore, the invention solves the technical problem which is that conventional backlight module and its corresponding liquid crystal display module have oversized thickness.

The present invention relates to a backlight module which comprises: a backboard having an inner surface and multiple concave portions mounted on the inner surface; and multiple light sources mounted in the concave portions, wherein the concave portions include strip concave portions and non-strip concave portions, wherein each of the strip concave portions has two ends respectively extending to two sides of the backboard; each of the non-strip concave portions has a circular shape or a polygonal shape; each of the light sources includes: a base; an LED mounted on the base; and a heat sink connected to the base; and each of the light sources is mounted on the concave portions via its heat sink.

In one embodiment of the backlight module of the present invention, the backlight module further includes a diffuser panel and at least one optical film; the diffuser panel is mounted at a side facing a light-emitting surface of the light sources; the optical film is mounted on a light-exiting surface of the diffuser panel; and a distance from a non-concave portion of the backboard to the diffuser panel is not larger than a distance from the light-emitting surface of the light sources to the diffuser panel.

The present invention further relates to another backlight module which comprises: a backboard having an inner surface and multiple concave portions mounted on the inner surface; and multiple light sources mounted in the concave portions.

In one embodiment of the backlight module of the present invention, the concave portions include non-strip concave portions having a circular shape or a polygonal shape.

In one embodiment of the backlight module of the present invention, the concave portions include strip concave portions, wherein each strip concave portion has two ends respectively extending to two sides of the backboard.

In one embodiment of the backlight module of the present invention, the concave portions include: strip concave portions, wherein each strip concave portion has two ends respectively extending to two sides of the backboard; and non-strip concave portions mounted between the strip concave portions, wherein the non-strip concave portions have a circular shape or a polygonal shape.

In one embodiment of the backlight module of the present invention, each of the light sources includes: a base; an LED mounted on the base; and a heat sink connected to the base; and each of the light sources is mounted on the concave portions via its heat sink.

In one embodiment of the backlight module of the present invention, the LED further has a first lens for enhancing light-emitting efficiency of the LED.

In one embodiment of the backlight module of the present invention, each of the light sources further includes a second lens mounted independently above the LED.

In one embodiment of the backlight module of the present invention, the backlight module further includes a diffuser panel and at least one optical film; the diffuser panel is mounted at a side facing a light-emitting surface of the light sources; the optical film is mounted on a light-exiting surface of the diffuser panel.

In one embodiment of the backlight module of the present invention, a distance from a non-concave portion of the backboard to the diffuser panel is not larger than a distance from the light-emitting surface of the light sources to the diffuser panel.

The present invention further relates to a liquid crystal display device which comprises a backlight module; and a display panel receiving lights from the backlight module for image display, wherein the backlight module includes: a backboard having an inner surface and multiple concave portions mounted on the inner surface; and multiple light sources mounted in the concave portions.

In one embodiment of the liquid crystal display device of the present invention, the concave portions include non-strip concave portions having a circular shape or a polygonal shape.

In one embodiment of the liquid crystal display device of the present invention, the concave portions include strip concave portions, wherein each strip concave portion has two ends respectively extending to two sides of the backboard.

In one embodiment of the liquid crystal display device of the present invention, the concave portions include: strip concave portions, wherein each strip concave portion has two ends respectively extending to two sides of the backboard; and non-strip concave portions mounted between the strip concave portions, wherein the non-strip concave portions have a circular shape or a polygonal shape.

In one embodiment of the liquid crystal display device of the present invention, each of the light sources includes: a base; an LED mounted on the base; and a heat sink connected to the base; and each of the light sources is mounted on the concave portions via its heat sink.

In one embodiment of the liquid crystal display device of the present invention, the LED further has a first lens for enhancing light-emitting efficiency of the LED.

In one embodiment of the liquid crystal display device of the present invention, each of the light sources further includes a second lens mounted independently above the LED.

In one embodiment of the liquid crystal display device of the present invention, the backlight module further includes a diffuser panel and at least one optical film; the diffuser panel is mounted at a side facing a light-emitting surface of the light sources; the optical film is mounted on a light-exiting surface of the diffuser panel.

In one embodiment of the liquid crystal display device of the present invention, a distance from a non-concave portion of the backboard to the diffuser panel is not larger than a distance from the light-emitting surface of the light sources to the diffuser panel.

Practicing the backlight module and the corresponding liquid crystal display device of the present invention has following advantages: by mounting the light sources in the concave portions of the backboard, the thickness of the backlight module can be reduced and does not affect the light-emitting quality of the backlight module. Therefore, the invention solves the technical problem which is that a conventional backlight module and its corresponding liquid crystal display module have oversized thickness.

In order to make the contents of the present invention to be more easily understood, the preferred embodiments of the present invention are described in detail in cooperation with accompanying drawings as follows:

DETAILED DESCRIPTION OF THE PREFERRED EMBODIMENTS

Figure 1:
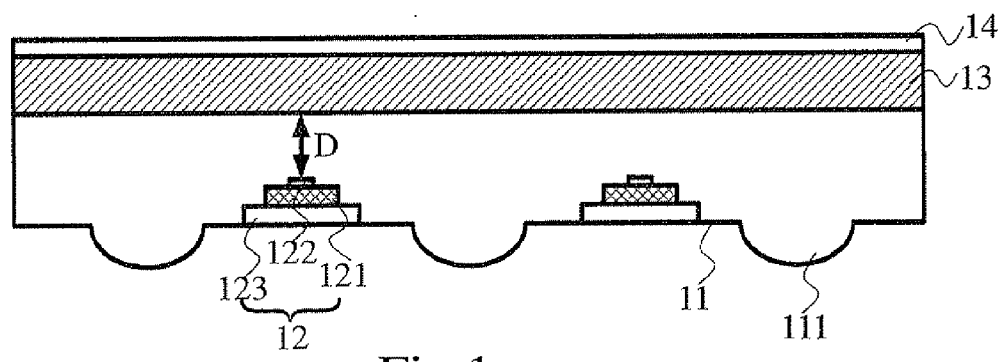
FIG. 1 is a side view of the structure of a conventional direct-type backlight module.

Following description of each embodiment is referring to the accompanying drawings so as to illustrate practicable specific embodiments in accordance with the present invention. The directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

In the drawings, units with similar structure are labeled with the same reference number.

Figure 2:
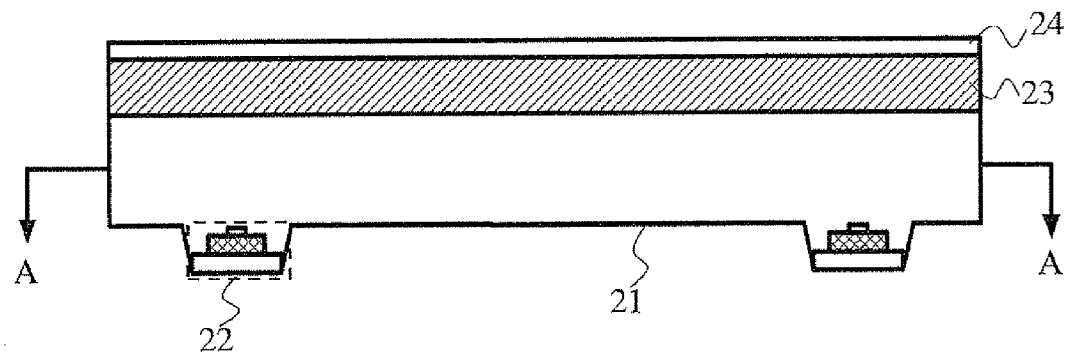
FIG. 2 is a side view of a first embodiment and a second embodiment of a backlight module in accordance with the present invention.
Figure 3:
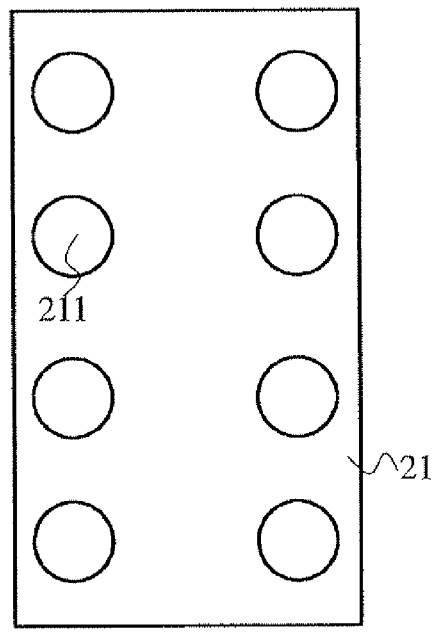
FIG. 3 is a top view taken in the direction line A-A in FIG. 2, showing the first embodiment of the backlight module of the present invention not including light sources.
Figure 4:
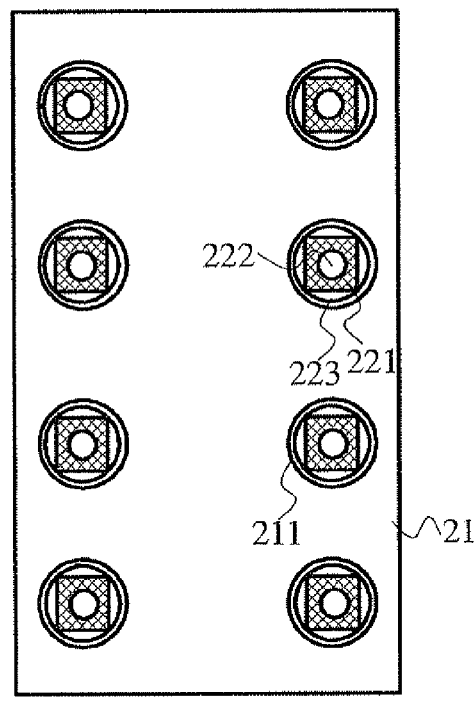
FIG. 4 is a top view taken in the direction line A-A in FIG. 2, showing the first embodiment of the backlight module of the present invention including light sources.

Please refer to FIGS. 2, 3 and 4, wherein FIG. 2 is a side view of a first embodiment of a backlight module in accordance with the present invention; FIG. 3 is a top view taken in the direction line A-A in FIG. 2, showing the first embodiment of the backlight module of the present invention without light sources; FIG. 4 is a top view taken in the direction line A-A in FIG. 2, showing the first embodiment of the backlight module of the present invention with light sources. The backlight module includes a backboard 21, multiple light sources 22, a diffuser panel 23 and at least one optical film 24. The light sources 22 are mounted on the backboard 21. The diffuser panel 23 is mounted above a light-emitting surface of the light sources 22 for receiving the lights emitted from the light sources 22 and improving the uniformity of the lights. The optical film 24 is mounted on a light-exiting surface of the diffuser panel 23 and is used for further improving the optical effect of the lights transmitted form the diffuser panel 23. The improved lights transmitted from the optical film 24 are directly transmitted into a corresponding display panel for image display.

In this embodiment, the backboard 21 has an inner surface and multiple concave portions mounted on the inner surface. The concave portions in this embodiment are non-strip concave portions 211. The non-strip concave portions 211 are relatively protruded out from a back of the backboard 21 such that the backboard 211 can be fixed in a corresponding position in a case of a corresponding liquid crystal display device. Meanwhile, the non-strip concave portions 211 can form a certain gap between the main body (that is, the flat part or non-concave part) of the backboard 21 and the case of the corresponding liquid crystal display device so as to reduce the influence that moving the case may assert on the backboard 21.

Each of the non-strip concave portions 211 forms an accommodating room. The non-strip concave portions 211 that is seen in the direction A-A in FIG. 2 may have a circular shape (as shown in FIG. 3), a polygonal shape or other irregular closed shape, as long as each of them can accommodate at least one light source 22.

In this preferred embodiment, the light sources 22 are mounted in the non-strip concave portions 211 on the backboard 21. Each of the light sources 22 includes a base 221 (such as a printed circuit board), an LED 222 and a heat sink 223 (such as an aluminum extrusion member). The LED 222 is mounted on the base 221. The heat sink 223 is connected to the base 221 for dissipating the heat generated from the LED 222 and the base 221. The light source 22 are mounted in the non-strip concave portions 211 via their heat sinks 223 such that a distance form the main body of the backboard 21 to the diffuser panel 23 is not larger than a distance from a light-emitting surface of the light sources 22 to the diffuser panel 23 (in other words, this means the light-emitting surface of the light sources 22 is relatively lower than a surface of the flat part of the backboard 21, as shown in FIG. 2, wherein the light-emitting surface of the light sources 22 herein is an imaginary plane defined by top ends of all the LED 222 of the light sources 22). Hence, the height of backlight cavity can be effectively reduced, for example, if the distance from the main body (the flat part) of the backboard 21 to the diffuser panel 23 is substantively equal to the distance from the light-emitting surface of the light sources 22 to the diffuser panel 23, and the heat sink 223 has a thickness of 2.5 mm, the base 221 has a thickness of 1.6 mm, the LED 222 has a thickness of 1.0 mm, the height of backlight cavity can be reduced by 5.1 mm without affecting the light-emitting effect of the backlight module or increasing the manufacturing cost of the backlight module. The distance from the light-emitting surface of the light sources 22 to the flat part of the backboard 21 is preferably less than 5 mm. However, as long as the light sources 22 are mounted in the concave portions of the backboard 21 for reducing the height of backlight cavity, the distance from the main body of the backboard 21 to the diffuser board 23 and the distance from the light-emitting surface of the light sources 22 to the diffuser panel 23 do not limit the scope of the present invention.

In a preferred embodiment, if the number of the LED 22 is relatively small and the power of each LED 22 is relatively large, each of the LEDs 222 may further has a first lens mounted therein; that is to make transparent packaging material of the LED 222 to be lens-shaped so as to enhance the light-emitting effect of the light sources 22 (to uniform the lights emitted from every angle of the light sources 22); besides, each of the light sources 22 may further have a second lens mounted independently outside the LED 222, that is to mount another lens independently above the LED 222 so as to further enhance the light-emitting effect of the light sources 22 (to further uniform the lights emitted from every angle of the light sources 22). Manufacturers may independently use the first lens or the second lens, or use both lenses or not use any lens according to specific requirements.

In a preferred embodiment of the present invention, the diffuser board 23 is mounted above the light sources 22 for improving the optical effect of the lights emitted from the light sources 22, and meanwhile at least one optical film 24 is mounted on a light-exiting surface of the diffuser panel 23. The material of the diffuser panel 23 may be UV curable resins, polymethyl methacrylate (PMMA) or polycarbonate (PC).

In a preferred embodiment of the present invention, the optical film 24 may be a diffusing film, a prism sheet, a turning prism sheet, a brightness enhancement film, a dual brightness enhancement film, a diffused reflective polarizer film or any combination thereof. The optical film 24 is mounted on the light-exiting surface of the diffuser panel for improving the optical effect of the lights transmitted from the diffuser panel 23.

Figure 5:
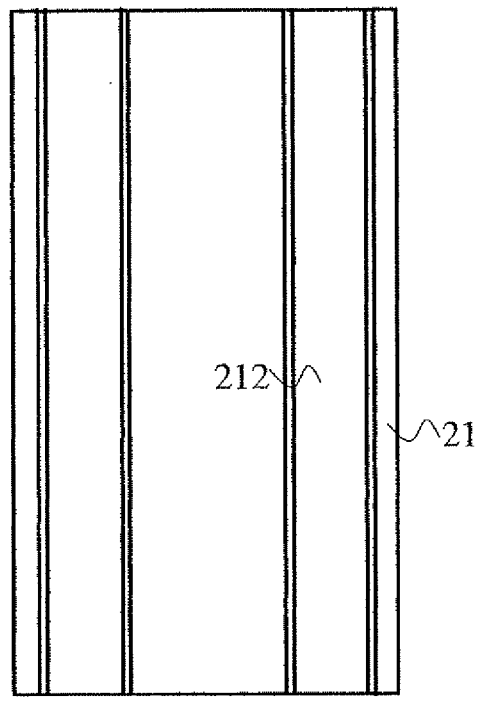
FIG. 5 is a top view taken in the direction line A-A in FIG. 2, showing the second embodiment of the backlight module of the present invention not including light sources.
Figure 6:
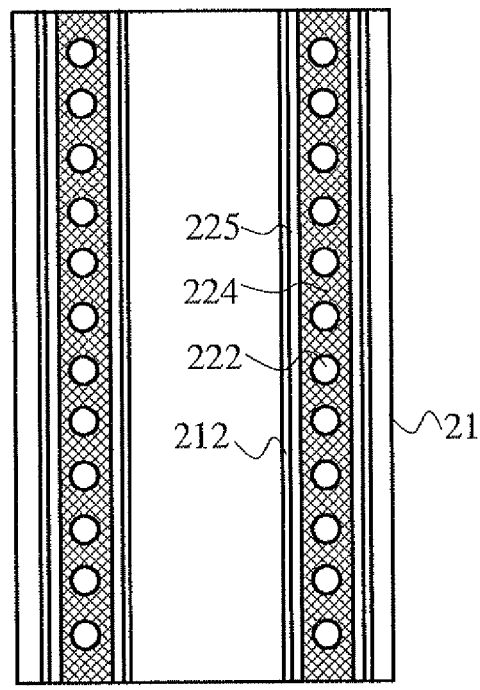
FIG. 6 is a top view taken in the direction line A-A in FIG. 2, showing the second embodiment of the backlight module of the present invention including light sources.

Please refer to FIGS. 2, 5 and 6, wherein FIG. 5 is a top view taken in the direction line A-A in FIG. 2, showing the second embodiment of the backlight module of the present invention not including light sources; and FIG. 6 is a top view taken in the direction line A-A in FIG. 2, showing the second embodiment of the backlight module of the present invention including light sources. The second embodiment differs from the first embodiment in that: the concave portions mounted on the inner surface of the backboard 21 are strip concave portions 212. The strip concave portions 212 are relatively protruded out from the back of the backboard 21 for the backboard 21 to be attached to the case of the corresponding liquid crystal display device and each of the trip concave portions 212 has two ends respectively extended to two sides of the backboard 21 that enhance structural strength of the backlight module. Meanwhile, the strip concave portions 212 can form a certain gap between the main body (that is, the flat part or non-concave part) of the backboard 21 and the case of the corresponding liquid crystal display device so as to reduce the influence that moving the case may assert on the backboard 21.

Each of the strip concave portions 212 forms an elongated indentation room that is able to accommodate a plurality of the light sources 22. A top view of the strip concave portions 212 is shown in FIG. 5, which is taken in the direction A-A in FIG. 2.

In this embodiment, the light sources 22 are mounted in the strip concave portions 212. Each of the light sources 22 includes a base, multiple LEDs 222 and a heat sink, wherein the base is a strip-shaped base 224 (such as a printed circuit board), the heat sink is a strip-shaped heat sink 225 (such as an aluminum extrusion member). The LEDs 222 are mounted on the strip-shaped base 224. The strip-shaped heat sink 225 is connected to the strip-shaped base 224 for dissipating the heat generated from the LEDs 222 and the strip-shaped base 224. The light sources 22 are mounted in the strip concave portions 212 via the heat sink 225 such that a distance form the main body of the backboard 21 to the diffuser panel 23 is not larger than a distance from a light-emitting surface of the light sources 22 to the diffuser panel 23 (in other words, this means the light-emitting surface of the light sources 22 is relatively lower than a surface of the main body of the backboard 21, as shown in FIG. 2). With such an arrangement, the height of backlight cavity can be reduced effectively without affecting the light-emitting effect of the backlight module or increasing the manufacturing cost of the backlight module. Besides, this embodiment using the strip-shaped heat sink 225 and the strip-shaped base 224 can accommodate more LEDs 222 to ensure uniformity of the lights from the backlight module, meanwhile the strip-shaped heat sink 225 and the strip-shaped base 224 can further enhance the strength of the structure of the backlight module.

Figure 7:
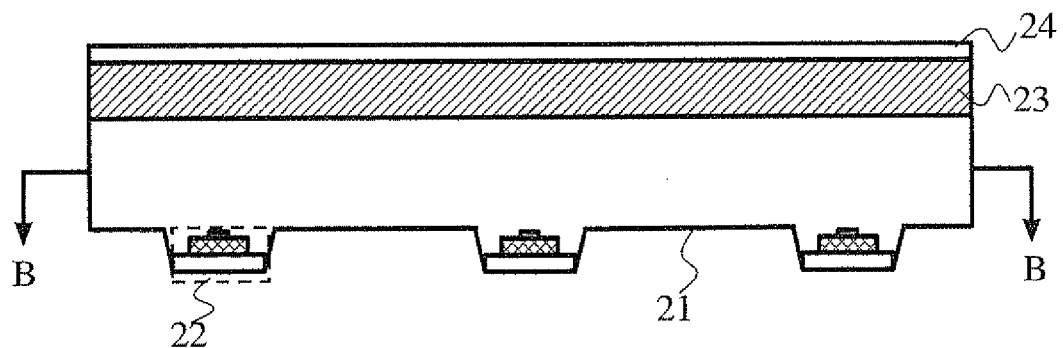
FIG. 7 is a side view of a third embodiment of the backlight module of the present invention.
Figure 8:
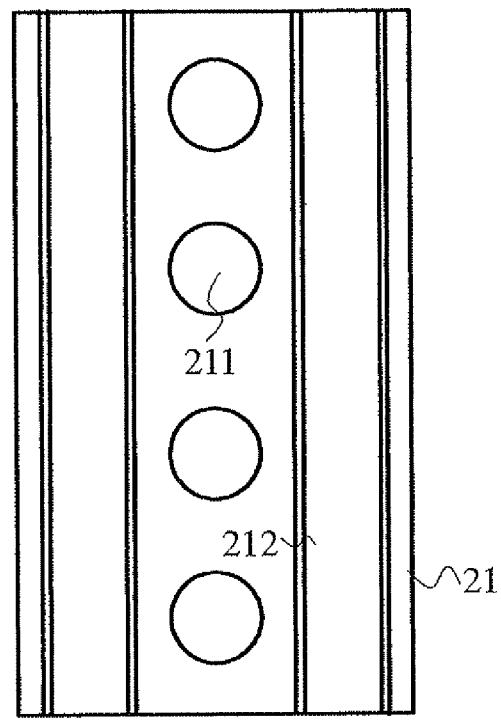
FIG. 8 is a top view taken in the direction line B-B in FIG. 7, showing the third embodiment of the backlight module of the present invention not including light sources.
Figure 9:
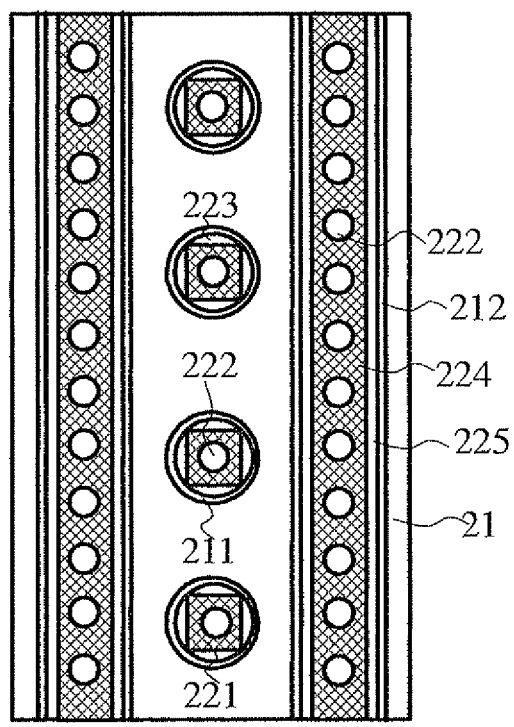
FIG. 9 is a top view taken along the line B-B in FIG. 7, showing the third embodiment of the backlight module of the present invention including light sources.

Please refer to FIGS. 7 to 9, wherein FIG. 7 is a side view of a third embodiment of the backlight module of the present invention; FIG. 8 is a top view taken in the direction line B-B in FIG. 7, showing the third embodiment of the backlight module of the present invention not including light sources; and FIG. 9 is a top view taken along the line B-B in FIG. 7, showing the third embodiment of the backlight module of the present invention including light sources. This embodiment uses both the non-strip concave portions 211 of the first embodiment and the strip concave portions 212 of the second embodiment, as shown in FIG. 8. The non-strip concave portions 211 are mounted in a middle of the backboard 21, and the strip concave portions 212 are mounted at two sides of the backboard 21. This embodiment has all the technical features and advantages in the first and the second embodiments. Comparing with the second embodiment, the third embodiment can accommodate more LEDs 222 to further enhance the uniformity of light-emitting by the backlight module.

The present invention further relates to a liquid crystal display device. The liquid crystal display device includes a display panel and a backlight module. The display panel is used for receiving lights from the backlight module for image display. The backlight module includes a backboard, multiple light sources, a diffuser panel and at least one optical film. The light sources are mounted on the backboard. The diffuser panel is mounted above a light-emitting surface of the light sources for receiving the lights emitted from the light sources. The optical film is mounted on a light-exiting surface of the diffuser panel for improving the optical effect of the lights transmitted from the diffuser panel. The improved lights transmitted from the optical film 24 are directly transmitted into a corresponding display panel for image display. The backboard has multiple concave portions, and the light sources are mounted in the concave portions of the backboard. The operation theory and advantages of the liquid crystal display device of the present invention are the same as or similar to the description of the specific embodiments of the backlight module, therefore please refer to the above-mentioned embodiments of the backlight module for further understanding.

By the above description, the backlight module and the corresponding liquid crystal display device of the present invention make the light sources to be mounted in the concave portions of the backboard such that the thickness of the backlight module is reduced and does not affect optical quality of the lights emitted from the backlight module or increase the manufacturing cost of the backlight module. Therefore, the invention solves the technical problem which is that conventional backlight module and its corresponding liquid crystal display module have oversized thickness.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A backlight module comprising:
   a backboard having an inner surface and multiple concave portions mounted on the inner surface, wherein each of the concave portions has a bottom surface lower than and integrally connected to the inner surface; and
   multiple light sources mounted in the concave portions, wherein
      the concave portions include strip concave portions and non-strip concave portions, and the light sources include a first plurality of light sources and a second plurality of light sources, where the first plurality of light sources are mounted in the strip concave portions and the second plurality of light sources are mounted in the non-strip concave portions, wherein each of the strip concave portions has two ends respectively extending to two sides of the backboard; each of the non-strip concave portions has a circular shape or a polygonal shape;
      each of the light sources includes:
         a base;
         an LED mounted on the base; and
         a heat sink connected to the base; and
      the light sources are mounted in both the strip and non-strip concave portions via their respective heat sinks;
      the backlight module further includes a diffuser panel and at least one optical film; the diffuser panel is mounted at a side facing a light-emitting surface of the light sources; the optical film is mounted on a light-exiting surface of the diffuser panel, wherein light from the light sources directly enters the diffuser panel; and
      the diffuser panel has a flat bottom surface facing the backboard, wherein a distance from a no-concave portion of the backboard to the diffuser panel is substantively equal to a distance from the light-emitting surface of the light sources to the diffuser panel.

2. The backlight module as claimed in claim 1, wherein the LED further has a first lens for enhancing light-emitting efficiency of the LED.

3. The backlight module as claimed in claim 2, wherein each of the light sources further includes a second lens mounted independently above the LED.

* * * * *